US009240104B2

(12) United States Patent
Lange et al.

(10) Patent No.: US 9,240,104 B2
(45) Date of Patent: Jan. 19, 2016

(54) GAMING, SYSTEM, METHOD AND DEVICE INCLUDING A SYMBOL CHANGING OR AUGMENTING FEATURE

(71) Applicant: Bally Gaming, Inc., Las Vegas, NV (US)

(72) Inventors: Keith Lange, Las Vegas, NV (US); Alexander Villagran, Las Vegas, NV (US)

(73) Assignee: Bally Gaming, Inc., Las Vegas, NV (US)

(*) Notice: Subject to any disclaimer, the term of this patent is extended or adjusted under 35 U.S.C. 154(b) by 0 days.

(21) Appl. No.: 14/205,746

(22) Filed: Mar. 12, 2014

(65) Prior Publication Data

US 2014/0194184 A1 Jul. 10, 2014

Related U.S. Application Data

(63) Continuation of application No. 13/290,762, filed on Nov. 7, 2011, now abandoned.

(60) Provisional application No. 61/413,196, filed on Nov. 12, 2010.

(51) Int. Cl.

*A63F 13/00* (2014.01)
*G07F 17/34* (2006.01)
*G07F 17/32* (2006.01)

(52) U.S. Cl.

CPC ............ *G07F 17/34* (2013.01); *G07F 17/3267* (2013.01)

(58) Field of Classification Search

USPC ...................................................... 463/16–25
See application file for complete search history.

(56) References Cited

U.S. PATENT DOCUMENTS

| | | | | |
|---|---|---|---|---|
| 6,251,013 | B1 | 6/2001 | Bennett | |
| 6,726,204 | B2 | 4/2004 | Inoue | |
| 7,341,512 | B2 * | 3/2008 | Dolloff et al. | 463/16 |
| 8,512,127 | B2 | 8/2013 | Jaffe et al. | |
| 2004/0242315 | A1 * | 12/2004 | Paulsen et al. | 463/20 |
| 2006/0142077 | A1 * | 6/2006 | Miles et al. | 463/20 |
| 2007/0060300 | A1 * | 3/2007 | Baerlocher | 463/20 |
| 2007/0287523 | A1 * | 12/2007 | Esses et al. | 463/20 |
| 2008/0132325 | A1 * | 6/2008 | Oles et al. | 463/20 |
| 2011/0230254 | A1 * | 9/2011 | Englman et al. | 463/25 |

* cited by examiner

*Primary Examiner* — Masud Ahmed

(74) *Attorney, Agent, or Firm* — Marvin A. Hein; Philip J. Anderson

(57) ABSTRACT

Gaming systems, devices and methods are set forth which provide for the selection and application of modifiers to game outcomes. The modifiers confer different functionalities to base game symbols or an augmenting functionality to alter or provide an outcome. Different sets of modifiers may be accessed randomly or under different conditions and event.

8 Claims, 10 Drawing Sheets

GAMING, SYSTEM, METHOD AND DEVICE INCLUDING A SYMBOL CHANGING OR AUGMENTING FEATURE

CROSS-REFERENCE TO RELATED APPLICATION

This application is a continuation of U.S. application Ser. No. 13/290,762 filed Nov. 7, 2011 which is based upon a prior filed U.S. provisional patent application Ser. No. 61/413,196 filed Nov. 12, 2010 and titled "A Gaming, System, Method and Device Including a Symbol Changing or Augmenting Feature

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The field of the invention relates to methods and apparatus for gaming of the type which display symbols defining an outcome. More particularly it relates to systems, methods and devices which include a feature to change or augment one or more outcomes of a base game by selection of modifiers from one or more modifier data sets stored locally or remotely in memory.

BACKGROUND OF THE INVENTION

Gaming devices such as casino gaming devices, e.g. slot machines, have been popular for over a century. Initially such devices were mechanical devices presenting one or more mechanical spinning reels to randomly select and display winning or losing outcomes at a single pay line. Modernly such devices are computer controlled and some include video displays, electro-mechanical stepper motor controlled physical reels or combinations thereof. Typically these devices display game symbols for the play of a base game and perhaps offer one or more secondary games sometimes referred to as bonus or feature games. For example, for a video device, the game may present a base game depicting video images of five reels each with three symbol display row positions, producing a 3 row×5 column matrix of positions for symbols. One or more pay lines are provided. Under control of the computer processor the video display depicts the reels spinning and stopping to arrange the game symbols in the matrix and where a predetermined winning combination of symbols is obtained on a wagered upon (i.e. enabled) pay line or pay arrangement the player receives a prize. Of course the foregoing description should not be deemed to be limiting since awards may be issued for symbols scatted in the matrix, i.e. a "scatter pay" and some symbols may trigger additional features such as a secondary game. Further game symbols may be a hand of cards such as for video Blackjack or video Poker, one or Keno, Bingo or Lottery cards or the like with different rules of play as is known in the art.

The prior art the spinning reel games, whether video or electro-mechanical, typically have fixed, defined physical or virtual reel strips. For mechanical reels the reel strips are printed on a substrate and hence are in fixed positions. The rotation and stopping of the reels is controlled by stepper motors and include a defined number of "stops". Typically a symbol ("symbol" as used herein, unless otherwise defined, includes blank positions on the reel where there is no graphic symbol) position is assigned to a stop position. A mechanical reel may have, for example, 22 stops. Of course a computer control may include many more virtual stops with the ability to map the computer selected stop to the physical stop on the reel strip as described in Telnaes, U.S. Pat. No. 4,448,419 issued May 15, 1984 and titled "Electronic Gaming Device Utilizing a Random Number Generator for Selecting the Reel Stop Positions", the disclosure of which is incorporated by reference. A controller, from a known index stop, controls the reel to a stop position to display the selected symbol.

It has been known to provide a game which includes outcome modifier reels. For example U.S. Pat. No. 7,377,850 titled "Gaming Device Having Multiple Bonuses Acting Independently of Simultaneously", the disclosure of which is incorporated by reference, discloses a gaming device having reels which spin to define an outcome for a base game and one or more modifier reels which spin to display modifiers such as multipliers for the base game and/or separate awards.

It is believed that the concept of providing "modifiers" to alter or augment the outcome of a base game has not been fully utilized. It would be advantageous to be able to apply modifiers to game outcomes without having to add one or more modifier reels to a game display. For an existing game, it would be advantageous if modifiers could be added to the game without significant alteration of the base game to thereby alter the game's pay structure, provide progressive prizes and refresh the architecture of the game. For new games it would be advantageous if modifiers could be used to provide the designers with numerous options for the game architecture such as how the modifiers will be displayed, if at all, which reels can be affected by modifiers, how the modifiers will affect the function of the game and whether the character of the game, by addition of the modifiers, will change during various triggered features.

It would also be advantageous of the possible addition of modifiers could be triggered by game events internal to the game or by event criteria from an external source such as a external trigger from a connected network, a certain time or date, a event occurring on another game or other predetermined or randomly occurring criteria.

SUMMARY OF THE INVENTION

In accordance with one embodiment of the present invention there is provided a gaming device of the type displaying game symbols of N game reels and apparatus for the player to make a wager and initiate play. The device includes a data structure storing, for at least one reel, data corresponding to a plurality of modifier sets. This data may correspond to modifiers which confer multipliers, "Wild" functionalities, prizes, base game symbol movement, i.e. symbols exchanging positions, triggers for other features and games, free game triggers or other functionalities. A game controller is configured to randomly select and display at said display at least one game symbol for each reel to define one or more winning or losing base game outcomes and to randomly select from one or more modifier sets one or more modifiers to apply to at least one reel. The modifiers may be displayed as symbols or other effects to the base game or its symbols to may be hidden from view to provide a mystery modification for the player. The modifier(s) selected function to altering or augment the base game outcome or provide other/additional functionality to the game such as triggering a feature or the like.

In a further embodiment, the controller is configured to, upon satisfaction of certain criteria, select a modifier data set and select one or more modifiers from that set. The selection may be defined or may be random. For example, where a set of free games has been won, the controller may be configured to select for one or more reels, a modifier data set which includes data to confer upon game symbols a "Wild" functionality to alter the hit frequency or other characteristic of the game.

In any embodiment the modifier sets can have data representing any number of modifiers. The selection of the modifiers can be coupled or uncoupled from the symbols of the base game. By coupling what is meant is that a modifier is selected for each symbol or stop of the base game reel and becomes coupled to the base game symbols.

The modifiers may be displayed or hidden. When displayed they may be displayed as overlays, borders, smaller symbols adjoining a base game symbol, flashing symbols or the like.

In some configurations the application of modifiers may be triggered by the base game, such as the selection of one or more base game symbols, by an event or condition divorced from the base game such as a random event or events or conditions outside of the base game such as by a network command or the like.

The modifiers can be applied to an existing game which may (or may not) require some adjustment to the base game architecture. For example, an existing game may have a free game feature which simply results in ten free game spins. By providing the modifier data structure and configuring the game controller, during the free game set modifiers may be selected to confer a "Wild" condition on one or more symbols or offer a multiplier of a base game award, provide for additional awards including progressives or the like to reinvigorate an existing game. The application of modifiers may require an additional wager such as, for example, where the modifiers represent a separate game or separate progressive game from the base game For new games, designers can use base game, feature games and modifier data sets to configure new and exciting features to games. For example, certain modifiers may trigger feature games, may cause base or feature game symbols to move such as a nudge or transposition feature, to confer a "wild" condition on one or more base or feature game symbols, to play a secondary game which may offer a progressive prize, to display, for accumulation, symbols which when a certain number have been acquired open a new feature of the game to the player, or any other feature the designer may have in mind.

BRIEF DESCRIPTION OF THE DRAWINGS

These and other features and advantages of the present invention will become apparent with reference to description and drawings wherein.

DETAILED DESCRIPTION OF THE PREFERRED EMBODIMENTS

Figure 1:
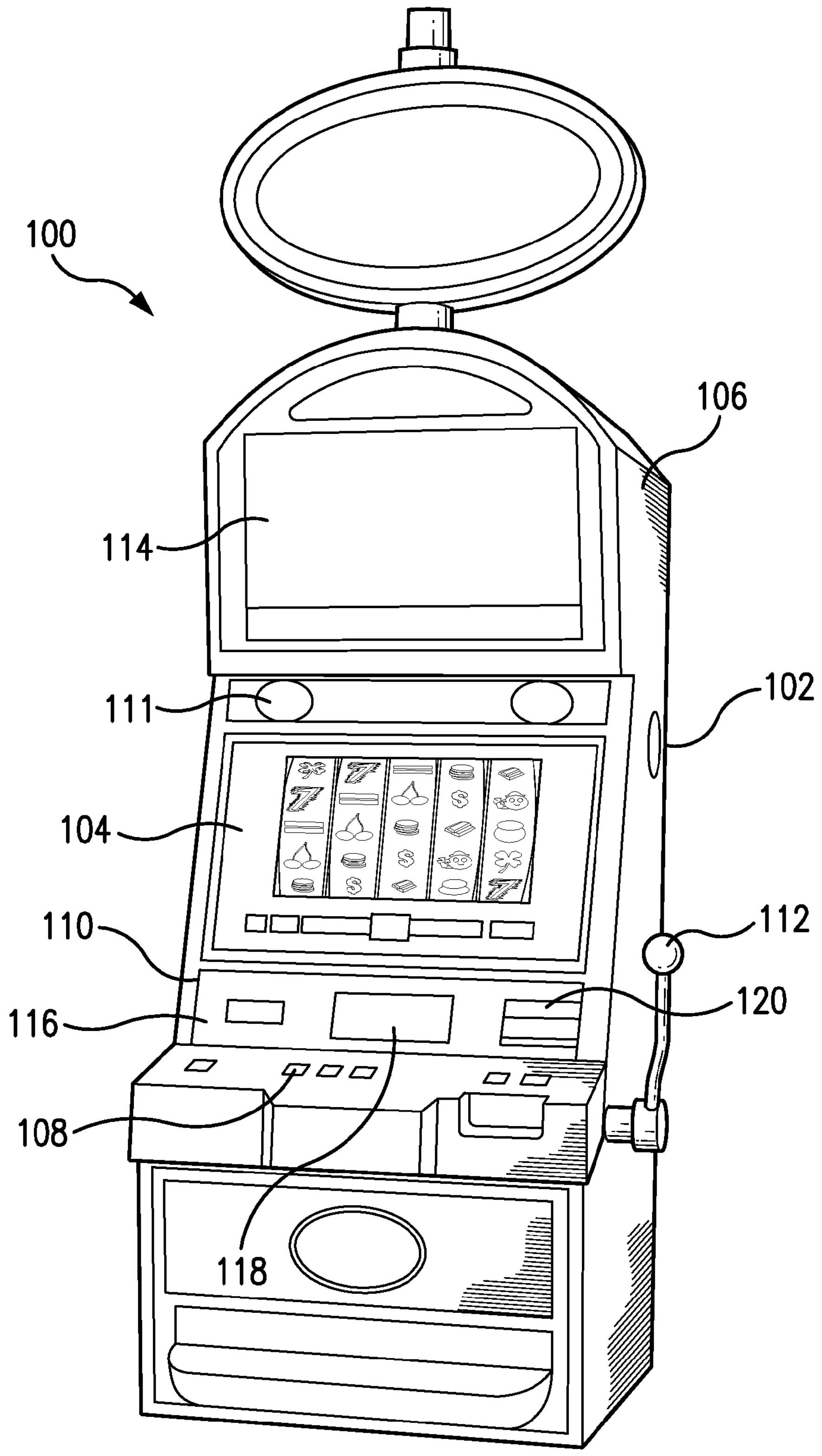
FIG. 1 is a front perspective view of a gaming device according to the present invention.

Referring now to the drawings, wherein like reference numbers denote like or corresponding elements throughout the drawings, and more particularly referring to FIG. 1, there is shown an embodiment of a gaming device 100 which may be employed according to apparatus, system and methods of the present invention. The gaming device 100 includes a cabinet housing 102, primary game display 104 upon which a primary game (sometimes referred to as a base game) and feature, bonus or community games may be displayed, top box 106 which may display multiple progressives that may be won during play of the primary, bonus or feature game, or a modifier based game, one or more player-activated input devices such as buttons 108 or by providing touch screen functionality to the primary screen display 104. A player tracking module 110 and a bill/voucher acceptor 120 may also be provided. One or more speakers 111 may also be mounted on the housing 102 to provide sounds to the player for example, scripted with the play of the game. The cabinet housing 102 is a self-standing unit that is generally rectangular in shape and may be manufactured with reinforced steel or other rigid materials which are resistant to tampering and vandalism. Cabinet housing 102 houses one or more processors, circuitry, data structures in the form of memory devices such as EEPROMS, flash memory, hard drive memory and software (not shown) configured for the operation of the gaming device 100 as hereinafter described. Any shaped cabinet housing may be implemented with any embodiment of gaming device 100 so long as it provides access to a player for playing a game. For example, cabinet housing 102 may comprise a slant-top, bar-top, or table-top style cabinet as is known in the art.

The plurality of player-activated buttons 108 may be used for various functions such as, but not limited to, selecting a wager denomination, selecting a game to be played, selecting a wager amount per game, initiating a game, selecting the number of pay lines to enable (i.e. wager upon) or cashing out money from gaming device 100. Buttons 108 function as input mechanisms and may include mechanical buttons, electromechanical buttons or touch screen buttons. Optionally, a handle 112 may be pulled by a player to initiate a game.

In other embodiments, buttons 108 may be replaced with various other input mechanisms known in the art such as, but not limited to, a touch screen system, touch pad, track ball, mouse, switches, toggle switches, control/joy stick or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938, 203, entitled, "Game Related Systems, Methods, and Articles That Combine Virtual and Physical Elements," filed on Nov. 9, 2007, hereby incorporated in its entirety by reference.

The cabinet housing 102 may optionally include the top box 106 which contains "top glass" 114 comprising advertising or payout information related to the game or games available on gaming device 100. The glass 114 may be replaced by a video display configured to display the aforesaid advertising and payout information or to display one or more features of a game, progressive prize information of the like.

The player tracking module 110, as is known in the art, includes a player tracking card reader 116 and a player tracking display 118. The voucher printer 120 may be integrated into player tracking module 110 or installed elsewhere in cabinet housing 102 or top box 106. The player tracking module 110 also includes a system interface input device such as a keypad or as by including touch screen input functionality at the player tracking display 118. Functionally the player tracking module 108 provides a communication interface between the gaming device 100 and one or more systems such as the player tracking system and/or a slot accounting system. As is known in the art the player tracking module 108 may also provide or communicate data such as gaming device meter information (i.e. coin-in, coin-out), jackpots, or other selected and configured events including maintenance, progressive, community gaming or other events. It should be understood that some communications between the gaming device 100 and any connected system may or may not pass through or communicate with the player tracking module 100. Some functionality of the player tracking module 108 may include displays at all or a portion of the primary game display 104 and/or top glass 114 display.

The primary game display 104 presents a game of chance wherein, in response to a wager, a player receives one or more outcomes from a set of potential outcomes. Mechanical or video/mechanical embodiments may include game displays such as a window or glass for viewing a number of electro-mechanical stepper reels as is known in the art or employment of a wheel for displaying/selecting either a primary game outcome or a bonus game outcome. In a video embodiment, the primary game display 104 is, typically, a CRT or a flat-panel display in the form of, but not limited to, liquid crystal, plasma, electroluminescent, vacuum fluorescent, field emission, laser or any other type of panel display known or developed in the art. The primary game display 104 may be mounted in either a "portrait" or "landscape" orientation and be of standard or "widescreen" dimensions (i.e., a ratio of one dimension to another of at least 16×9). A widescreen display in a "portrait" orientation may be 32 inches tall by 18 inches wide. Additionally, primary game display 104 as referenced above may include a touch screen or touch glass system (not shown). The touch screen functionality may be in lieu of or in addition to input buttons 108. An example of a touch glass system is disclosed in U.S. Pat. No. 6,942,571, entitled "Gaming Device with Direction and Speed Control of Mechanical Reels Using Touch Screen," which is hereby incorporated by reference.

The primary game display 104 may is configured to present to a player wagering games such as a video or electro-mechanical reel slot game, a video keno game, a lottery game, a bingo game, a Class II bingo game, a roulette game, a craps game, a blackjack game, a mechanical or video representation of a wheel game, video Poker or other game. Additionally, the primary game display 104 alone or perhaps in conjunction with a top glass 114 video device may be configured to present one or more feature or additional games.

The primary game display 104 may also present information such as, but not limited to, player information, advertisements and casino promotions, graphic displays, news and sports updates, or even offer an alternate game. This information may be generated at the gaming device 100 or through a host computer networked with gaming device 100 on its own initiative or it may be obtained by request of the player using either one or more of the plurality of player-activated buttons 108; the primary game display 104 itself (if game display 104 comprises a touch screen or similar technology) buttons (not shown) mounted about primary game display 104 which may permit selections such as those found on an ATM machine (where legends on the screen are associated with respective selecting buttons) or any player input device that offers the required functionality.

Figure 2:
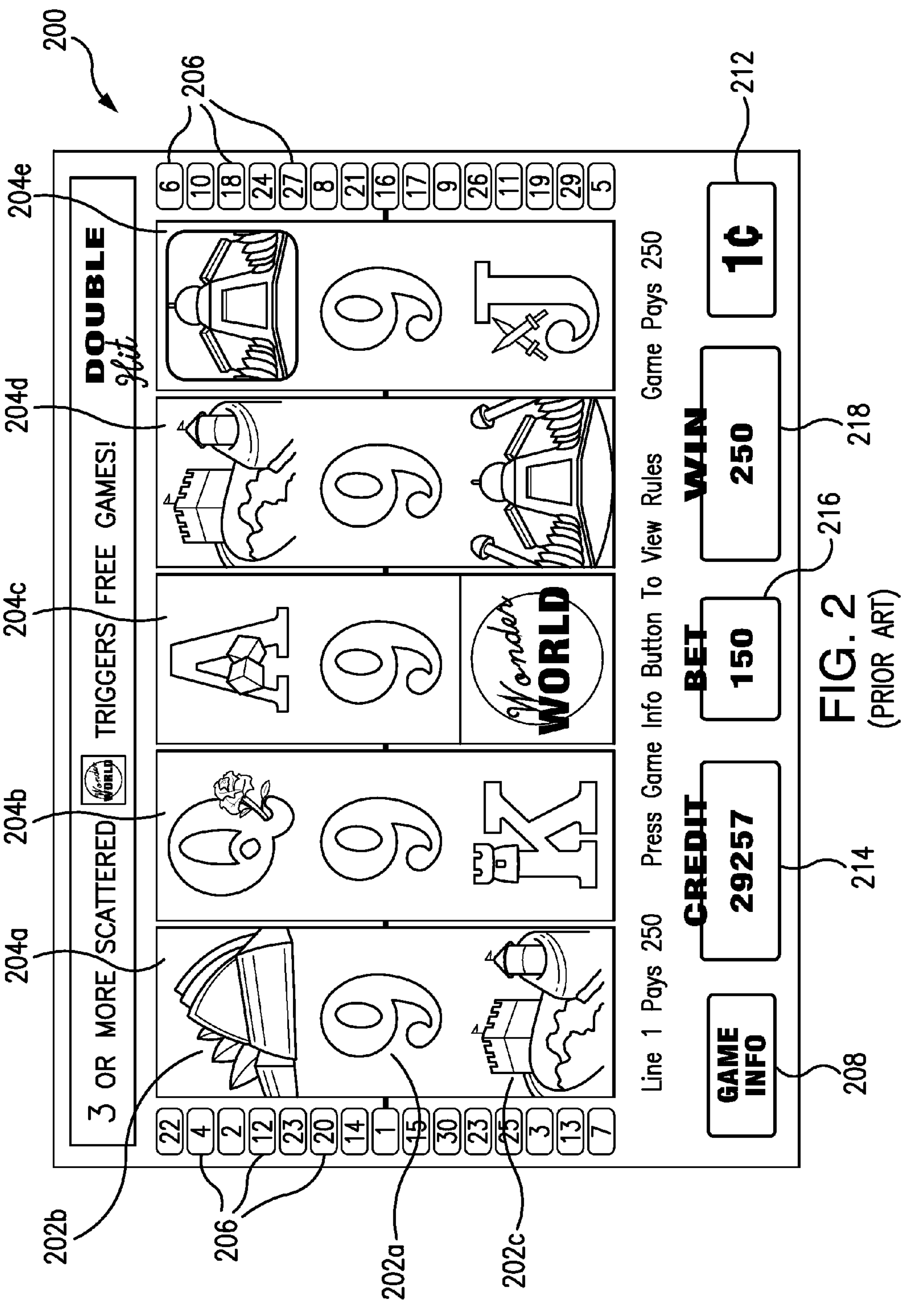
FIG. 2 (PRIOR ART)
FIG. 2 is a view of a base game display according to the prior art.

As stated above the gaming device 100 is adapted to provide a game of chance to a player. FIG. 2 shows a typical display of a base game of change which may be displayed. The base game is, for example, displayed at the primary game display 104 and includes a game matrix 200 defined by rows 202*a-c* and columns 204*a-e* of symbols. "Symbols" as used herein can include blanks The columns 204*a-d* are often displayed as reels with the rows depicted as symbols on those reels reminiscent of the traditional mechanical reel games. The rows 202*a-c* and columns 204*a-d* define 15 coordinates or symbol locations for the game matrix 200. The display may also include several informational markers. For example, the game depicted in FIG. 2 is a 30-line game which means the player has the ability to wager upon 30 pay lines which traverse, virtually, the matrix 200 in a known fashion. Along the sides of the matrix 200 are line identifiers 206. As a player wagers upon, i.e. enables, a pay line the corresponding identifier 206 is highlighted. When an award is won on a pay line the corresponding identifier may also be highlighted to tell the player which line had a winning symbol arrangement.

Below the matrix 200 several touch screen buttons or meters may be shown. A game info button 208 is a touch screen button which opens a display of game information such as how to play the game, the awards, pays and features. At 210 is a denomination indicator 212 showing that the displayed game is a 1¢/credit game. Credit meter 214, bet meter 216 and win meter 218 display, respectively, the credits available to the player for wagering, the amount of the current bet and the amount won from the spin.

Figure 3:
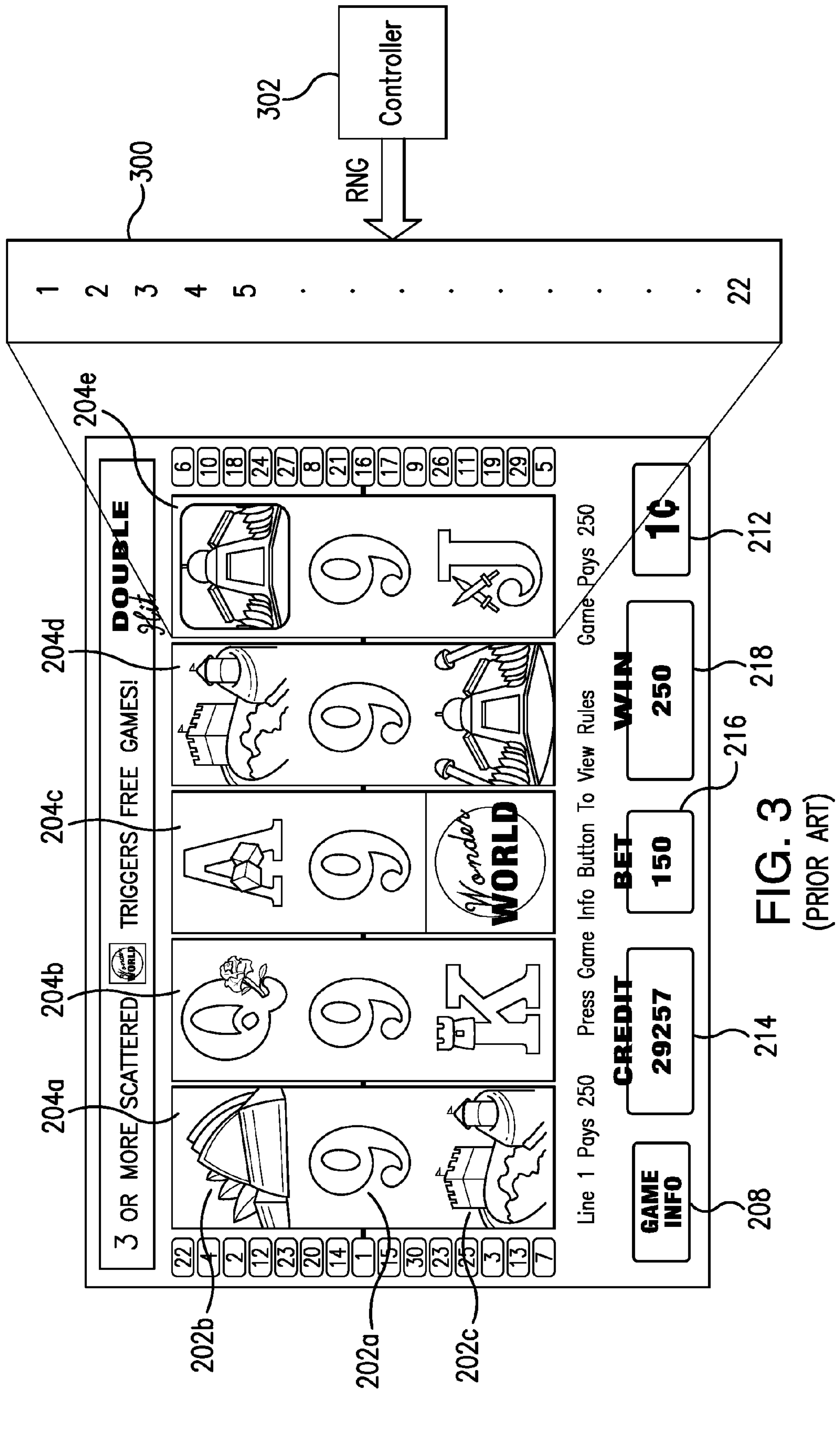
FIG. 3 (PRIOR ART)
FIG. 3 is a view of a base game display according to the prior art and illustrating the concept of reel stops and random selection.

Turning to FIG. 3, operation of an embodiment of a prior art base game will be described. Each column 204*a-d* has a corresponding reel strip data set 300. While only one reel strip data set 300 is shown in FIG. 3 it should be understood that there would be such a set for each reel. The reel strip data set 300 may include code addresses (shown as 1-22 for illustrative purposes) which control a graphic software engine and graphic memory which correspond to the display of a symbol. The reel strip data set 300 typically has a fixed number of addresses (which correspond to symbols). By making the reel strip data set larger or smaller the game designer can control a games performance architecture such as hit frequency (average plays before a win), and probabilities of symbols or symbol combinations appearing. The reel strip data sets 300 for the reels may have a different number of addresses and may address different symbols, e.g. a "Wild" symbol may only be used in the center reel column 204*c*. By matching these probabilities with awards the designer can craft a symbol PAR (probability and accounting) sheets for the game. This PAR sheet will set forth all of the winning combinations for the game, the corresponding probability of occurrence and the award. By summing the individual numbers the overall payback to the player can be determined. Some gaming jurisdictions require that the payback be at least a certain minimum, e.g. 80% (for every dollar wagered theoretically the player should win 80¢).

Continuing with FIG. 3, when a player initiates a play a controller 302 uses a random number generator to randomly select an address for each reel strip data set 300 which is then mapped to the center row 202*a* for each reel. The data corresponding to the symbols for columns 202*b, c* are also taken from the reel strip data set 300 so that the symbols retain their adjacent relationship as defined at the reel strip data set 300. The corresponding symbols are displayed in the matrix 200 and winning or losing outcomes are determined.

Other techniques may be used. For example once an address is selected the adjacent symbols may be defined.

While the foregoing description of the prior art was directed to a video based spinning reel game, the same description may be applied to an electro-mechanical stepper reel game.

Further the prior art games may include several variations. For example, some games include features such as "scatter" pays which issue an award whether or not the symbol or symbol combination is on an enabled pay line. That is, the winning combination can be scattered in the matrix 200. Some games do not use pay lines but rather use pay arrangements such as the game described in Bennett, U.S. Pat. No. 6,093,102 titled "Multiline Gaming Machine" the disclosure of which is hereby incorporated by reference. In this game a player wagers upon symbol arrangements rather than pay lines.

As can be appreciated, game designers are constrained by the static nature of the reel strip data sets inasmuch as they are tied to the physical reel strips which will be displayed. That is, the symbol adjacency on the virtual reel strip must be maintained. The "9" for column 204*a* must, for this portion of the virtual reel strip, remain between the symbols for the "Sydney Opera House" and the "Castle". To try to provide some variation, features have been added to games such as free game sets, "Wild" symbols, feature games such as pick a prize games or spinning wheel games or the like. These features, though, are often tied to the base game having trigger symbols which must be selected to trigger the feature. Thus the addition of a feature results in alteration of the base game and its architecture. If the game is a modification of an existing game the alteration may cause loyal players to turn away from the existing game. There is a need for a game to be provided with the ability to be modified without altering or significantly altering the base game architecture or look and feel, with the ability to add a feature to a game without altering the underlying base game, and with the ability to add features triggered or provided from additional sources to increase the excitement of the game.

Figure 5A:
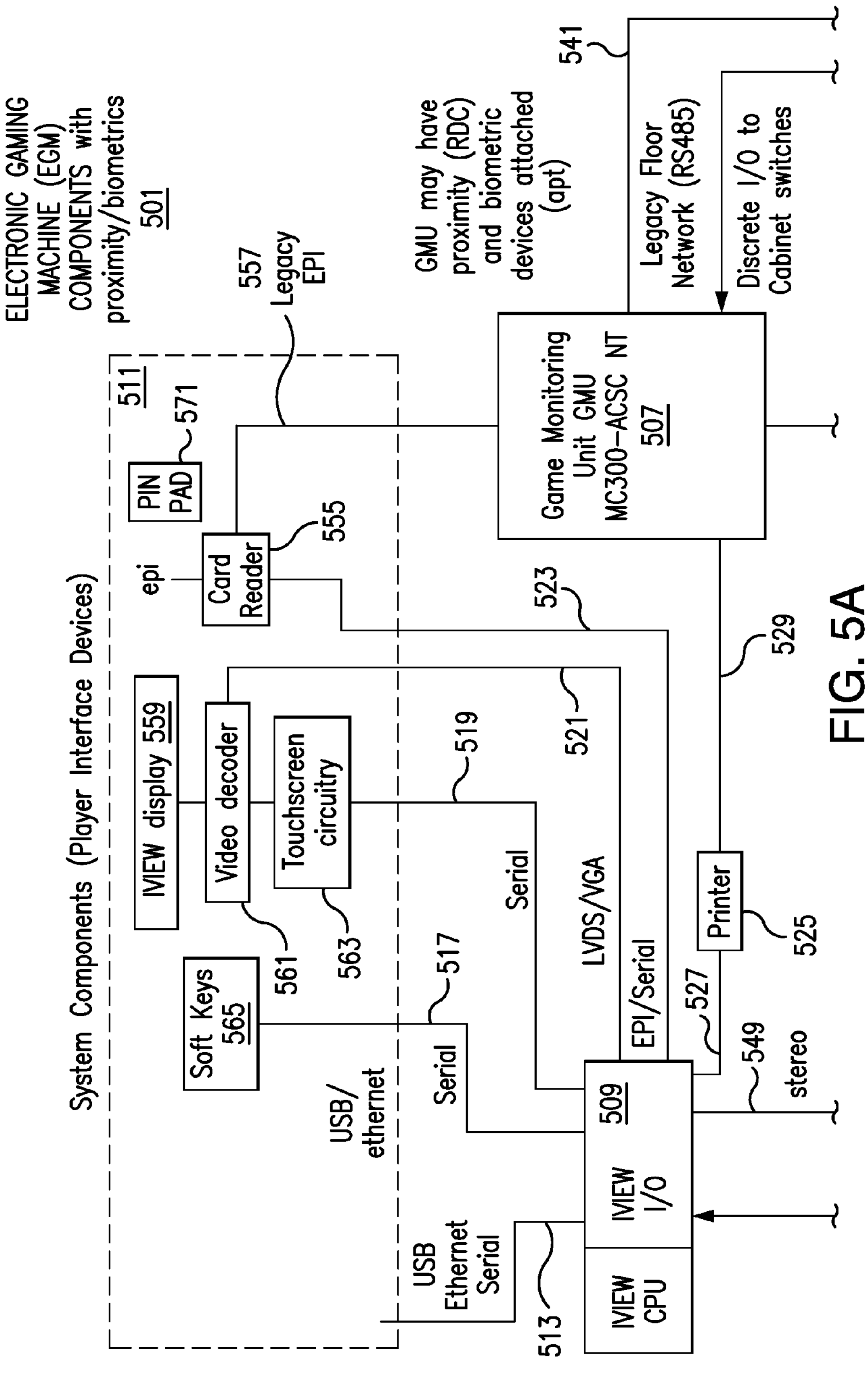
FIGS. 5A-B illustrate an example of a gaming machine operational platform and components for a gaming terminal of the type of the present invention.
Figure 5B:
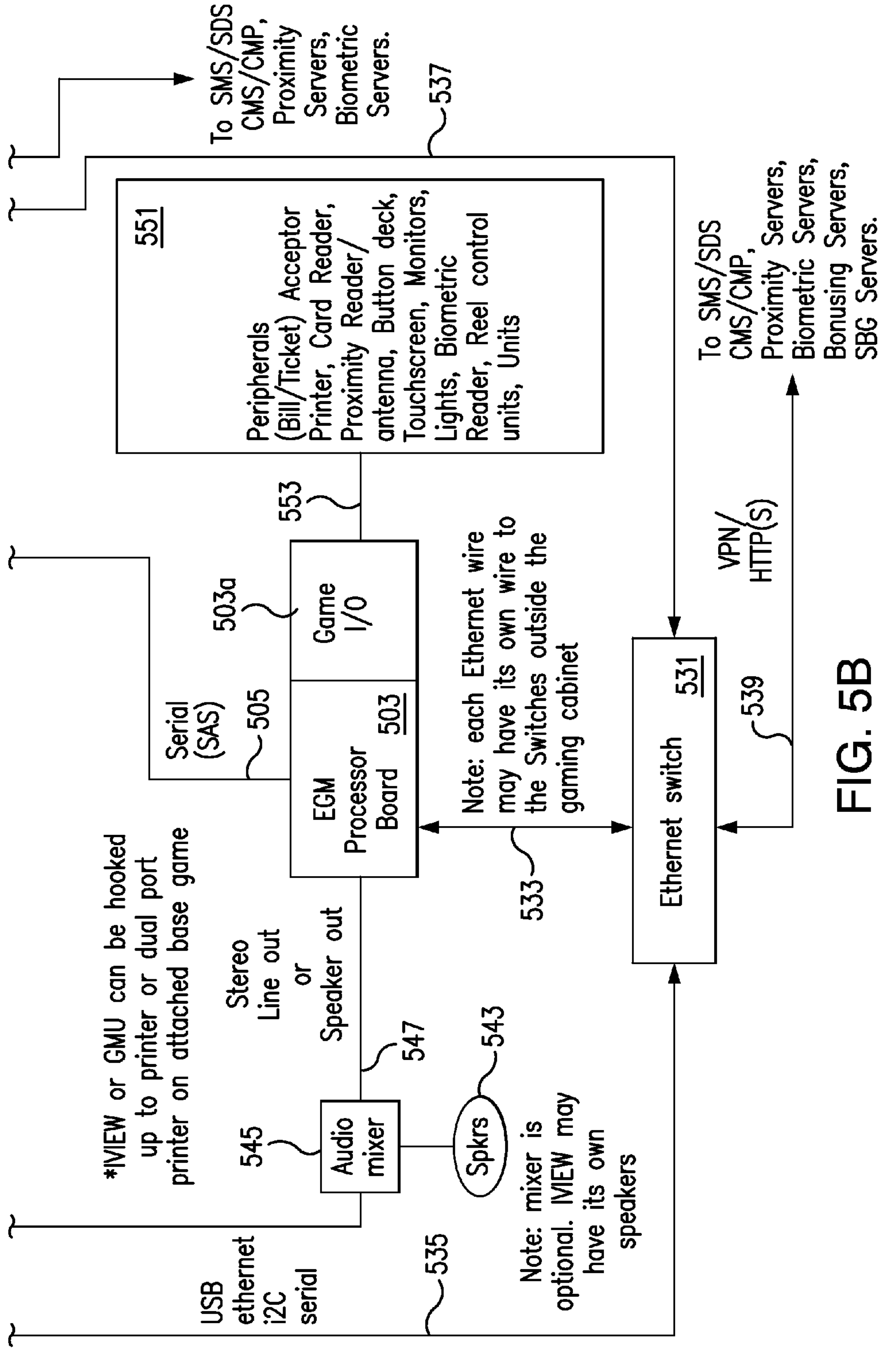

Turning now to FIGS. 5A-5B the gaming device 100 hardware 501 for its various controller(s) is shown for purposes of illustration. The hardware/software/firmware and operating platforms for a game can vary without departing from the scope of the present invention. The hardware 501 includes base game integrated circuit board 503 (EGM Processor Board) connected through serial bus 505 to game monitoring unit (GMU) 507 (such as a Bally MC300 or ACSC NT), and player interface integrated circuit board (PIB) 509 connected to player system interface devices 511 over buses 513, 517, 519, 521, 523. Gaming voucher ticket printer 525 (for printing player cash out tickets) is connected to PIB 509 and GMU 507 over buses 527, 529. EGM Processor Board 503, PIB 509, and GMU 507 connect to Ethernet switch 531 over buses 533, 535, 537. Ethernet switch 531 connects to a slot management system (SMS) and a casino management system (CMS) network over bus 539. Ethernet switch 531 may also connect to a server based gaming server or a downloadable gaming server. GMU 507 also may connect to the SMS and CMS network over bus 541. Speakers 543 produce sounds related to the game or according to the present invention connect through audio mixer 545 and buses 547, 549 to EGM Processor Board 503 and PIB 509.

Peripherals 551 connect through bus 553 to EGM Processor Board 503. The peripherals 551 include, but are not limited to the following and may include individual processing capability: bill/ticket acceptor to validate and accept currency and ticket vouchers, player loyalty card reader, the player interfaces including features to support the touch screen/gesture functionality such as buttons 106, primary game display 104, and secondary display (with or without touch screen functionality), monitors and lights, reel control units where the gaming terminal 100 is a stepper game and biometric reading (capturing) devices (if any). For example, a bill/ticket acceptor is typically connected to the game input-output board of the EGM processing board 503 (which is, in turn, connected to a conventional central processing unit ("CPU") board), such as an Intel Pentium microprocessor mounted on a gaming motherboard. The I/O board may be connected to CPU processor board by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming device operating system (OS), such as a Bally Alpha OS. EGM processor board 503 executes a game program that causes the gaming device 100 to display and play a game. The various components and included devices may be installed with conventionally and/or commercially available components, devices, and circuitry into a conventional and/or commercially available gaming device housing 102, examples of which are described above.

When a player has inserted a form of currency such as, for example and without limitation, paper currency, coins or tokens, cashless tickets or vouchers, electronic funds transfers or the like into the currency acceptor, a signal is sent by way of bus 553 to the I/O board and to EGM processor board 503 which, in turn, assigns an appropriate number of credits for play in accordance with the game program. The player may further control the operation of the gaming device 100 by way of other peripherals 551, for example, to select the amount to wager via a player interface such as the buttons 108. The game starts in response to the player operating a start mechanism such as the handle 112, button such as a SPIN/RESET button touch screen icon or depressing a button 108 or pulling the handle 112. The game program includes a random number generator to provide a display of randomly selected indicia on one or more of the primary and/or secondary displays. In some embodiments, the random number generator may be physically separate from gaming terminal 100; for example, it may be part of a central determination host system which provides random game outcomes to the game program. Finally, processor board 503 under control of the game program and OS compares the final display of indicia to a pay table. The set of possible game outcomes may include a subset of outcomes related to the triggering of a feature or bonus game. In the event the displayed outcome is a member of this subset, processor board 503, under control of the game program and by way of I/O Board 553, may cause feature game play to be presented on the primary game display 104 or a display constituting all or a portion of the top glass 114.

Predetermined payout amounts for certain outcomes, including feature game outcomes, are stored as part of the game program. Such payout amounts are, in response to instructions from processor board 503, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server such as a downloadable gaming server. The gaming device 100 may access the remote storage device via a network connection, including but not limited to, a local area network connection, a TCP/IP connection, a wireless connection, or any other means for operatively networking components together. Optionally, other data including graphics, sound files and other media data for use with the gaming device 100 are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the gaming device 100 using USB, serial or Ethernet connections. Each of the respective devices may have upgrades to their firmware utilizing these connections.

GMU 507 includes an integrated circuit board and GMU processor and memory including coding for network communications, such as the G2S (game-to-system) protocol from the Gaming Standards Association, Las Vegas, Nev., used for system communications over the network. As shown, GMU 507 may connect to a player card reader 555 (component 116 in FIG. 1) through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509 is operable as the player interface. PID 509 connects to card reader 555 through bus 523, player system interface display 118 through video decoder 561 and bus 521, such as an LVDS or VGA bus.

As part of its programming, the PID processor executes coding to drive system interface display 118 and provide messages and information to a player. Touch screen circuitry 563 interactively connects display 118 and video decoder 561 to PID 509; such that a player may input information and cause the information to be transmitted to PID 509 either on the player's initiative or responsive to a query by PID 509. Additionally soft keys 565 connect through bus 517 to PID 509 and operate together with the display 118 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511, i.e. devices of the player tracking module 110, are linked into the virtual private network of the system components in gaming device 100. The system components include the iVIEW® device ('iView" is a registered trademark of Bally Gaming, Inc.) processing board and game monitoring unit (GMU) processing board may provide the functionality of the player tracking module 110. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

In an alternative embodiment the player system interface including the player tracking display 118 may instead be presented, upon command or request by the player, as all or a portion of the primary game display 104 as what is referred to a system interface window or service window. Where the primary game display 104 has touch screen functionality, upon command or a request, the content at the primary game display 104 such as a video reel game display is sized to accommodate the service window display at the primary game display 104. The touch screen functionality for the primary game display 104 is configured to enable the player to interact with the interface through touch screen controls (buttons, sliders, arrows, etc.).

Figure 6:
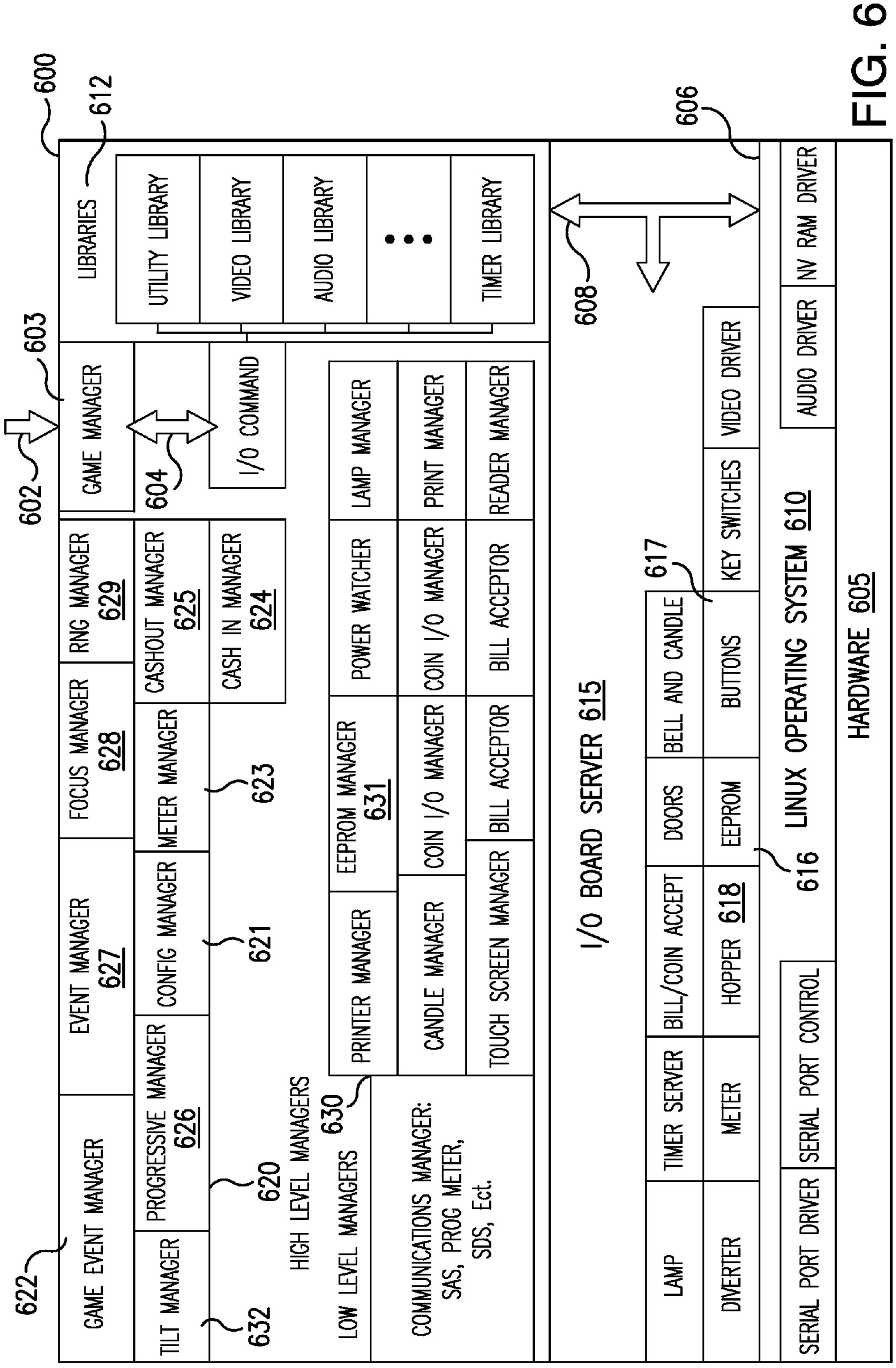
FIG. 6 is a block diagram of the logical components of a gaming kernel for a gaming terminal.

Turning to FIG. 6 is a functional block diagram of a gaming kernel 600 of a game program under control of processor board 503, uses gaming kernel 600 by calling into application programming interface (API) 602, which is part of game manager 603. According to the present invention the API 602 may include the software module(s) such as the faceAPI (referenced above) for face tracking as well as the software module(s) for rendering the 3*d* virtual reality images based upon detected motion parallax. These software applications may be stored in a suitable memory device such as a flash memory, thumb drive or the like. The components of game kernel 600 as shown in FIG. 3 are only illustrative, and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general (ii) kept to a minimum and (iii) are easier to leave than extract. In such cases, the low-level communications is handled within operating system 610 and the contents passed to library routines 612.

Thus, in a few cases library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 503 connected to a unique, relatively dumb, and as inexpensive as possible I/O adapter board, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able make use of API 602 to use the capability over that of a cabinet having traditional monaural sound).

Game manager 603 provides an interface into game kernel 600, providing consistent, predictable, and backwards compatible calling methods, syntax, and capabilities by way of game application API 602. This enables the game developer to be free of dealing directly with the hardware, including the freedom to not have to deal with low-level drivers as well as the freedom to not have to program lower level managers 630, although lower level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of high level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started; configuration manager 621 has data needed to initialize and correctly configure other objects or servers.

The high level managers 620 of game kernel 600 may include game event log manager 622 which provides, at the least, a logging or logger base class, enabling other logging objects to be derived from this base object. The logger object is a generic logger; that is, it is not aware of the contents of logged messages and events. The log manager's 622 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during start-up, from configuration manager 621. While running, the cash in 624 and cash out 625 managers call the meter manager's 623 update functions to update the meters. Meter manager 623 will, on occasion, create backup copies of the soft meters by storing the soft meters' readings in EEPROM. This is accomplished by calling and using EEPROM manager 631.

Progressive manager 626 manages progressive games playable from the game machine. Event manager 627 is generic, like log manager 622, and is used to manage various gaming device events. Focus manager 628 correlates which process has control of various focus items. Tilt manager 632 is an object that receives a list of errors (if any) from configuration manager 621 at initialization, and during game play from processes, managers, drivers, etc. that may generate errors. Random number generator manager 629 is provided to allow easy programming access to a random number generator (RNG), as a RNG is required in virtually all casino-style (gambling) games. RNG manager 629 includes the capability of using multiple seeds.

A credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash out devices correctly and selects any selectable cash out denominations. During play, a game application may post a cash out event through the event manager 627 (the same way all events are handled), and using a call back posted by cash out manager 625, cash out manager 625 is informed of the event. Cash out manager 625 updates the credit object, updates its state in non-volatile memory, and sends an appropriate control message to the device manager that corresponds to the dispensing device. As the device dispenses dispensable media, there will typically be event messages being sent back and forth between the device and cash out manager 625 until the dispensing finishes, after which cash out manager 625, having updated the credit manager and any other game state (such as some associated with meter manager 623) that needs to be updated for this set of actions, sends a cash out completion event to event manager 627 and to the game application thereby. Cash in manager 624 functions similarly to cash out manager 625, only controlling, interfacing with, and taking care of actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of 8 bit command and data writes to the EEPROM device to write the appropriate data in the proper location within the device. Any errors detected will be sent as IPC messages to game manager 603. All of this processing is asynchronous.

In accordance with one embodiment, button module 617 within I/O server 615, polls (or is sent) the state of buttons at the user interface 1018 every two milliseconds. These inputs are debounced by keeping a history of input samples. Certain sequences of samples are required to detect a button was pressed, in which case the I/O server 615 sends an interprocess communication event to game manager 603 that a button was pressed or released. In some embodiments, the gaming machine may have intelligent distributed I/O which debounces the buttons, in which case button module 617 may be able to communicate with the remote intelligent button processor to get the button events and simply relay them to game manager 603 via IPC messages. In still another embodiment, the I/O library may be used for pay out requests from the game application. For example, hopper module 618 (where a coin/token hopper is provided) must start the hopper motor, constantly monitor the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 7:
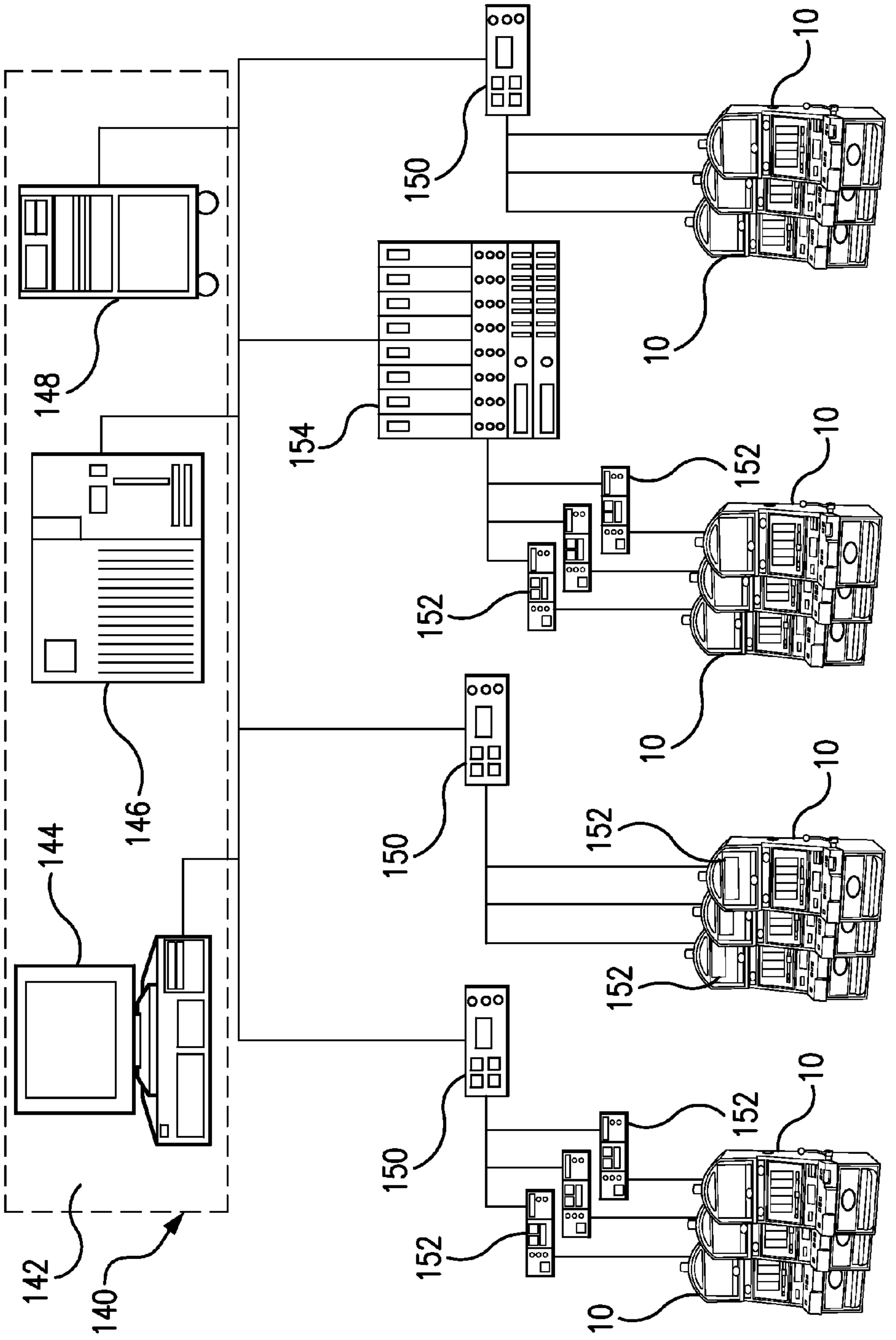
FIG. 7 is a schematic of an example of a network incorporating gaming terminals.

In many cases the gaming device 100 will be connected to one or more systems. FIG. 7 illustrates a casino gaming system 140 that may include one or more gaming devices 100 and one or more servers. Networking components facilitate communications between a backend system 142 and game management units 152 that control displays for carousels of gaming devices 100 across a network. Game management units (GMU's) 152 (507 in FIG. 5A) connect the gaming devices 100 to networking components and may be installed in the gaming device housing 102 or external to the gaming device 100. The function of the GMU 152 is similar to the function of a network interface card connected to a desktop personal computer (PC). Some GMU's 152 have much greater capability and can perform such tasks as presenting and playing a game using a display (not shown) operatively connected to the GMU 152. In one embodiment, the GMU 152 is a separate component located outside the gaming device 100. Alternatively, in another embodiment, the GMU 152 is located within the gaming device 100 as the player tracking module 110 (FIG. 1). Optionally, in an alternative embodiment, one or more gaming devices 100 connect directly to a network and are not connected to a GMU 152.

The gaming devices 100 are connected via a network to a network bridge 150, which is used for networking, routing and polling gaming devices, including slot machines. The network bridge 150 connects to the back end system 142. Optionally, the gaming devices 100 may connect to the network via a network rack 154, which provides for a few numbers of connections to the back end system 142. Both, network bridge 150 and network rack 154 may be classified as middleware, and facilitate communications between the back end system 142 and the GMUs 152. The network bridges 150 and network rack 154 may comprise data repositories for storing network performance data. Such performance data may be based on network traffic and other network related information. Optionally, the network bridge 804 and the network rack 806 may be interchangeable components. For example, in one embodiment, a casino gaming system may comprise only network bridges 150 and no network racks 154. Alternatively, in another embodiment, a casino gaming system may comprise only network racks 154 and no network bridges 150. Additionally, in an alternative embodiment, a casino gaming system may comprise any combination of one or more network bridges 150 and one or more network racks 154.

Figure 4:
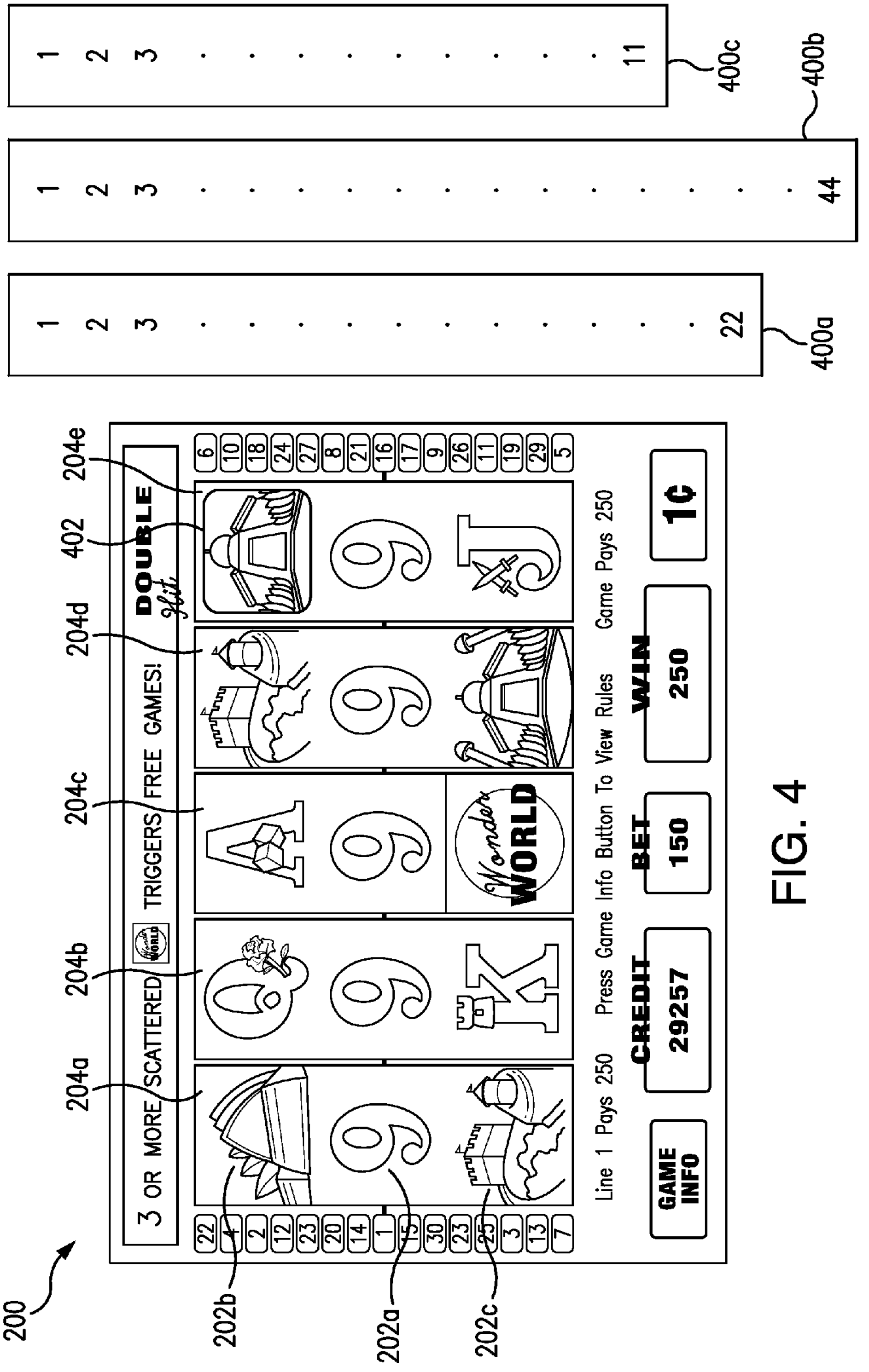
FIG. 4 illustrates a base game display and modifier data sets according to an embodiment of the present invention.

The back end system 142 may be configured to comprise one or more servers as hereinafter described. The type of server employed is generally determined by the platform and software requirements of the gaming system. In one embodiment, as illustrated in FIG. 4, the back end system 142 is configured to include three servers: a slot floor controller 144, a casino management server 146 and a casino database 148. As described with reference to FIG. 5 the casino resort enterprise may include other servers. The slot floor controller 144 is a part of the player tracking system for gathering accounting, security and player specific information. The casino management server 146 and casino database 148 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end system 142 performs several functions. For example, the back end system 142 can collect data from the slot floor as communicated to it from other network components, and maintain the collected data in its database. The back end system 142 may use slot floor data to generate a report used in casino operation functions. Examples of such reports include, but are not limited to, accounting reports, security reports, and usage reports. The back end system 142 may also pass data to another server for other functions. Alternatively, the back end system 142 may pass data stored on its database to floor hardware for interaction with a game or game player. For example, data such as a game player's name or the amount of a ticket being redeemed at a game may be passed to the floor hardware. Additionally, the back end system 142 may comprise one or more data repositories for storing data. Examples of types of data stored in the system server data repositories include, but are not limited to, information relating to individual player play data, individual game accounting data, gaming terminal accounting data, cashable ticket data, sound data, and optimal display configurations for one or more displays for one or more system game. In certain embodiments the back end system 142 may include game download functionality to download and change the game played on the gaming devices 100, provide server based gaming or provide some or all of the data processing (including if desired graphics processing as described herein) to the gaming devices 100.

Of course, one will appreciate that a gaming system 140 may also comprise other types of components, and the above illustrations are meant only as examples and not as limitations to the types of components or games used in a casino gaming system. For example, the gaming system 140 may include a server which can trigger events from predetermined or random criteria to cause modifiers, as hereinafter described, to be imported into a game to provide additional functionality, awards or features.

Turning now back to FIG. 4 there is shown a base game display matrix 200 of the type described above. To provide additional functionality and features to the game according to an embodiment of the present invention there is provided for at least one column 204*a-e* (reel), and in addition to any applicable reel strip data set 300, one or a plurality of data structures 400*a-c* defining modifier data sets. The data structures 400*a-c* store data including one or more modifier functionalities. The data may be stored in a fashion similar to that of the reel strip data sets 300 as suggested in FIG. 4 or it may simply be data stored in any fashion that facilitates random selection from a memory. For example one data structure 400*a* for the fifth reel (column 204*e*) may include 22 addresses similar to the reel strip data set for the fifth reel. The data structure 400*a* at one address may include data corresponding to a multiplier and at another address data which, if selected, confers a "Wild" function. The remainder of the addresses may contain nothing or "Blank" or "Null" functions, i.e. confers no functionality or effect. Before, during or after the selection of the base game symbols, data is selected from the data structure 400*a* and either assigned (tied) to a symbol of the virtual reel for column 204*e* or is assigned to a coordinate position in column 204*a* with a base game symbol. The selection from the data structure 400*a* may be random or may be scripted or forced as desired by the game designer. The selection and application of any modifier can occur before, during or after the display of the base game symbols. Where the data structure 400*a* has the same number of data addresses the selection of the base game symbols and any modifier data can be coupled. That is, the data structure 400*a* would act as a virtual reel overlaying the reel defining column 204*e* and the two would be indexed together by the selection of the base game symbols and the modifiers and act as if thereafter rotated together. Alternatively the data structure 400*a* is uncoupled from the base game reel symbol data structure 300 as described above. Uncoupling permits alternate and a plurality of data structures 400*a-c* as shown.

As depicted in FIG. 4 a plurality of data structures 400*a-c* may correspond to one or more or all reels defining the columns 240*a-e*. The data structures 400*a-c* may include different modifier data in different distributions with other modifier data and/or blanks. For example, where no modifier effect is to be provided to a base game symbol set 300 for a reel, the data structure 400*a-c* for the reel may only contain blanks. Where the data structure is to contain only "Wild" functionality, one or more data addresses may contain data corresponding to conferring a "Wild" functionality with blanks. Thus the data structures 400*a-c* can be configured as desired and their application can be either by a default instruction or may be triggered by internal or external cues. The selection of the modifier data structures 400*a-c* can be random or as specifically chosen.

It should be understood that while three data structures 400*a-c* are shown, more or fewer can be provided. Alternatively a library of data structures may be provided which are available for application to some or all columns 204*a-e* of the base game. Based upon certain criteria the software code for the game may be pointed to a particular modifier data structure of the library for selection of modifier data. Thus, for any reel, the designer can point to a modifier data structure for the selection of the modifier.

Figure 8:
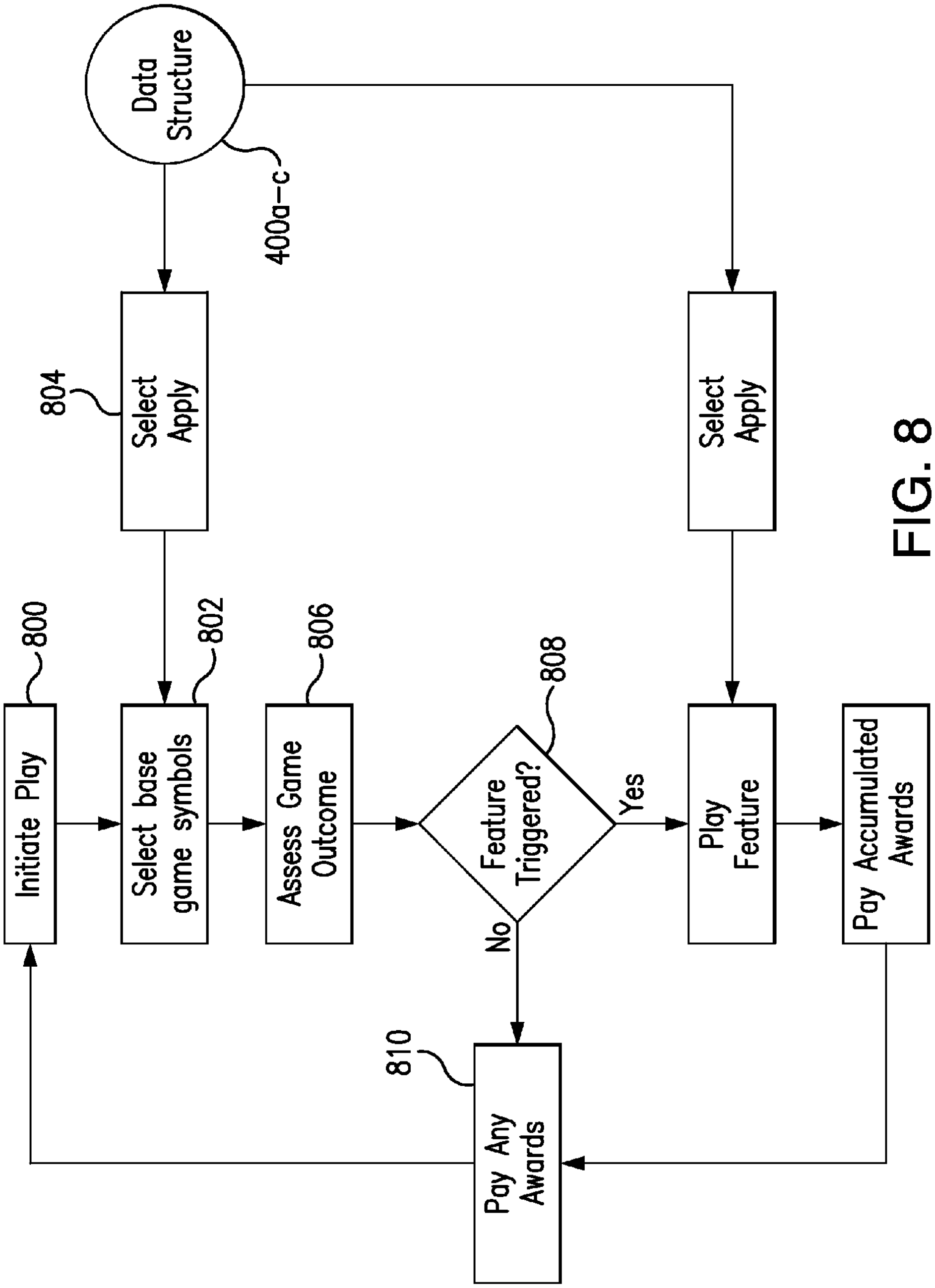
FIG. 8 is a logic diagram of the process to select and apply modifiers to a base game.
Figure 9A:
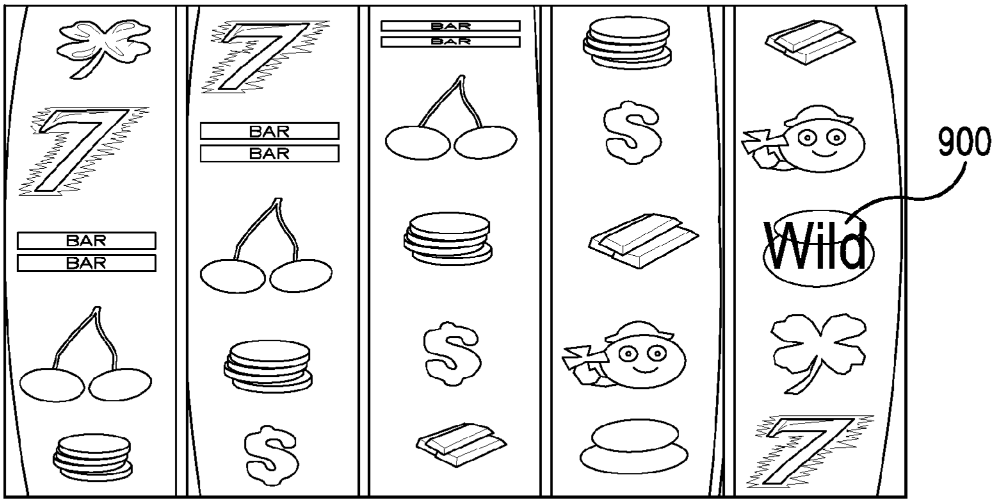
FIGS. 9A-B illustrate a spinning reel base game with modifiers applied and displayed.
Figure 9B:
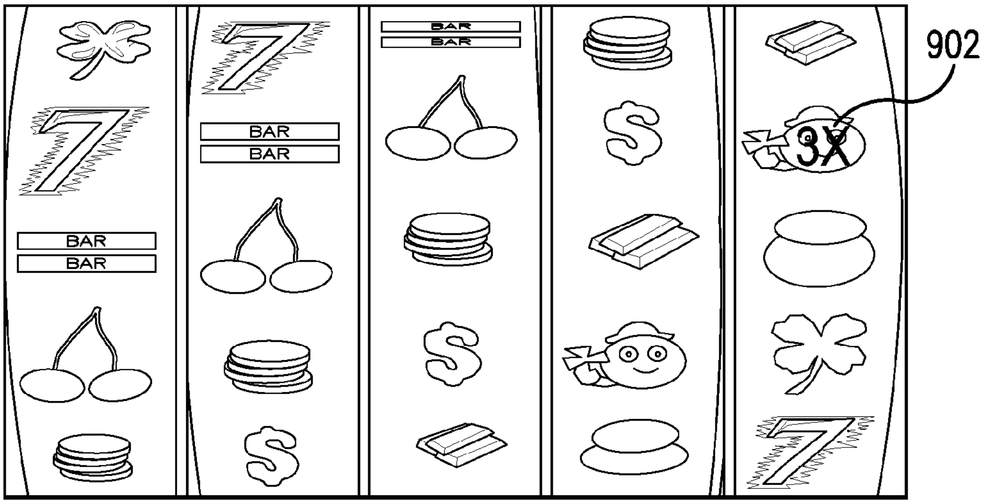

FIG. 8 is a logic diagram for a non-limiting embodiment of the present invention. At 800 the player initiates play by making a wager and prompting play. The wager will, for a spinning reel game, enable certain pay lines or pay arrangements according to the rules of the game and lodge a wager on one or more credits on each enabled pay line or arrangement. When play has been initiated, at 802 the game processor or controller, selects from the reel strip data set 300 the base game symbols to be displayed to define a base game outcome. At the same time, or before or after the selection of the base game symbols at 802, the controller at 804 selects any modifiers from the modifier data structures 400*a-c* and applies them to the base game. As described above, depending upon the game architecture, certain spins may not call up the selection and application of modifiers (dispensing with step 804) and even if a modifier is selected it may be a blank or have a null function and effect to the base game. For purposes of explanation it will be assumed that the selection of a possible modifier has been instructed for the fifth reel (column 204*e*) and that the modifier is data which confers a "Wild" condition. At 806 the base game outcome and/or the base game outcome as modified is assessed to determine if the player has won an award. In one embodiment any base game award is assessed independent of whether the base game with any modifiers produces an additional award. The selection and application of any modifier may be hidden; but preferably results in a modifier symbol being applied to the game matrix 200. For example, and with reference to FIG. 9A, where a modifier has been selected and it is to be applied into the 5×5 game matrix 200 shown, the "Wild" designation 900 may appear as an image superimposed over the base game image. In FIG. 9B there is illustrated where the modifier is a 3× multiplier designation 902 also shown superimposed over the base game symbol With reference to FIG. 4, the application of the modifier may be displayed as a border 402 placed about the base game symbol as suggested by the "Castle" symbol in row 202*b*, 204*e*. Continuing with FIG. 8, at 808 the outcome of the base game with or without the application of any modifiers is tested to determine if any feature has been triggered. A non-limiting list of possible features would be a set of free spins/plays, entry into a separate feature game such as a game where selections are made or a wheel is spun, any separate progressive game or award, a feature triggered randomly regardless of the symbols of the base game with or without modifiers such as described in Olive, U.S. Pat. No. 7,056,215 titled "Slot Machine Game and System With Improved Jackpot Feature" which randomly triggers a feature apart from the game outcome, or a feature triggered by external events or conditions such as a feature triggered at the network level as described herein below or triggered by another gaming device. If no feature is triggered, at 810 awards, if any, are paid to the player and the player is ready to initiate another play at 800.

If a feature is triggered at 812 the player plays the feature. As but a non-limiting example, if the feature is a set of free spins, the player may prompt the start of play of the sets. The feature may be configured to randomly multiply winning outcomes. In this instance for each spin the game controller would select from a modifier data structure 400*a-c* which includes one or more multipliers and if (1) a multiplier is selected, (2) the multiplier is to be applied to a base game symbol selected and falling into the game matrix 200 such as suggested in FIG. 9B and (3) the multiplier is included in a winning pay line or pay arrangement, then any award would be multiplied. By configuring the modifier data structure 400*a-c*, the probabilities of selecting a multiplier are known and can be summed into the PAR determination for the overall game.

It should be understood that the availability of the modifier functionality described herein may require a separate wager. Otherwise the contribution of the modifier elements to the game can be assessed with base game and feature game contributions to craft a game with the desired performance.

As stated above the selection and application of any modifier may be triggered external to the game such as at the network level. With reference to description for FIG. 7, the gaming device 100 is connected to a gaming system 140. The gaming system 140 may include a function to trigger the selection of modifiers for a game. For example, the system may track the play on all gaming devices 100 on the network and when certain criteria has been satisfied such as total jackpots paid, total wagers, coin-in toward a progressive prize or other satisfaction of other predetermined criteria or a random selection process resulting in a trigger, a command may be sent to one or more gaming devices 100 resulting in the selection and possibly application of modifiers to a game. The command may be to select and apply any modifiers to the next game. The command may be to select modifiers as a second game toward winning a progressive prize, or the like.

Where the base game is a mechanical stepper game the modifiers as selected and applied may be displayed at a separate display or at an overlying transmissive video display.

The application of modifiers in addition to those described above may include functionalities such as making one or more base game symbols "Wild" such as an entire column or making all displayed base game symbols of a certain type Wild, causing symbols to exchange their position in the matrix (or enabling the player to select to make the exchange), nudging symbols vertically or horizontally in the matrix 200 to make a winning combination, conferring the ability to hold a symbol or reel for one or subsequent plays, automatically holding a symbol or reel for one or subsequent plays, adding more free games in the event a free game feature is triggered, accumulation of symbols toward a prize or feature or the like.

Where the base game is a video Poker, Keno or other game, modifiers can be selected an applied as well. For example, for video Poker, when triggered a multiplier modifier may be selected to multiply any winning outcome. Further a separate game such as a spinning reel game or a separate Stud Poker game could be provide through modifiers to the video Poker cards. For Keno a modifier could multiple an award, provide a separate award, trigger the draw of additional numbers, provide a free play or the like.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A gaming device comprising:

a controller to control a video display;

apparatus in communication with said controller for accepting and validating currency for wagering;

a data structure storing data corresponding to a plurality of virtual reel strips of base game symbols for display at said video display to define base game winning and losing outcomes apparatus in communication with said controller for a player to input a wager and initiate play of a game;

a memory storing data corresponding to virtual modifier reel strips including indicators arranged in a series, said indicators of said modifier reels including modifiers and blanks, said modifiers indicating a modification to a base game outcome;

said controller configured to, upon initiation of play of a game, randomly select for each modifier reel strip a segment in the series of said indicators for said modifier reels, to a randomly select said segment in said series of base game virtual base reel symbols, tie said selected segments and to control said video display to display the indicators associated with said selected segment of the modifier reel strip overlaid atop said base games symbols associated with the tied modifier reel indicators with the selected position overlaid atop said base game symbols associated with selected position in said series of base game virtual base reel symbols, if said selected and displayed segment includes a modifier to modify the base game outcome according to the modifier.

2. The gaming device of claim 1 comprising said memory storing data of modifiers indicating modification of a base game selected from the group consisting of (a) turning a base game symbol underlying said modifier to a Wild symbol, (b) providing a multiplier of any base game symbol award including the base game symbol underlying the modifier and (c) a nudge to the selected segment in the series of said base reel strip underlying the modifier to display to change the base game symbols displayed.

3. The gaming device of claim 1 comprising said controller configured to display said base game symbols and said indicators for said modifier reels substantially simultaneously.

4. The gaming device of claim 1 comprising said controller configured to display said base game symbols before the display of said symbols for said modifier reels.

5. The gaming device of claim 1 comprising said controller configured to display said base game symbols after the display of said symbols for said modifier reels.

6. The gaming device of claim 1 comprising said memory storing data corresponding to virtual modifier reel strips including indicators arranged in a series of Y number of indicators where Y>X.

7. A gaming device comprising:

a controller to control a video display;

apparatus in communication with said controller for accepting and validating currency for wagering;

a reader for reading a player loyalty card;

a data structure storing data corresponding to a plurality of virtual reel strips of base game symbols for display at said video display to define base game winning and losing outcomes apparatus in communication with said controller for a player to input a wager and initiate play of a game;

a memory storing data corresponding to virtual modifier reel strips including indicators arranged in a series, said indicators of said modifier reels including modifiers and blanks, said modifiers indicating a modification to a base game outcome;

said controller configured, upon initiation of play of a game, to randomly select for each modifier reel strip a segment in the series of said indicators for said modifier reels, to a randomly select said segment in said series of base game virtual base reel symbols, tie said selected segments and to control said video display to display the indicators associated with said selected segment of the modifier reel strip overlaid atop said base games symbols associated with the tied modifier reel indicators with the selected position overlaid atop said base game symbols associated with selected position in said series of base game virtual base reel symbols, if said selected and displayed segment includes a modifier to modify the base game outcome according to the modifier.

8. The gaming device of claim 7 comprising said memory storing data of modifiers indicating modification of a base game selected from the group consisting of (a) turning a base game symbol underlying said modifier to a Wild symbol, (b) providing a multiplier of any base game symbol award including the base game symbol underlying the modifier and (c) a nudge to the selected segment in the series of said base reel strip underlying the modifier to display to change the base game symbols displayed.

* * * * *